United States Patent
Puthenpura et al.

(10) Patent No.: US 8,526,320 B2
(45) Date of Patent: Sep. 3, 2013

(54) METHOD AND APPARATUS FOR AUTOMATIC ESTIMATION OF TRAFFIC REASSIGNMENT

(75) Inventors: Sarat Puthenpura, Berkeley Heights, NJ (US); David G. Belanger, Hillsborough, NJ (US); Sam Houston Parker, Cranbury, NJ (US); Ravi Raina, North Brunswick, NJ (US); Gopalakrishnan Meempat, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 280 days.

(21) Appl. No.: 12/957,547

(22) Filed: Dec. 1, 2010

(65) Prior Publication Data
US 2012/0140643 A1 Jun. 7, 2012

(51) Int. Cl.
*H04W 24/00* (2009.01)

(52) U.S. Cl.
USPC ........... 370/252; 370/229; 370/230; 370/232; 709/223; 709/224; 455/403; 455/422.1; 455/434

(58) Field of Classification Search
None
See application file for complete search history.

(56) References Cited

U.S. PATENT DOCUMENTS

| | | | |
|---|---|---|---|
| 7,142,868 B1 * | 11/2006 | Broyles et al. | 455/453 |
| 8,050,671 B2 * | 11/2011 | Calin et al. | 455/424 |
| 8,073,455 B1 * | 12/2011 | Xie et al. | 455/452.1 |
| 2004/0214583 A1 * | 10/2004 | Graham et al. | 455/453 |
| 2005/0288032 A1 * | 12/2005 | Orellana et al. | 455/452.1 |

* cited by examiner

*Primary Examiner* — Charles C Jiang
*Assistant Examiner* — Amy Ling (57) ABSTRACT

A method and apparatus for providing an estimation of traffic reassignment for a network are disclosed. For example, the method and apparatus provide an automatic estimation of traffic reassignment for a wireless network.

20 Claims, 6 Drawing Sheets

METHOD AND APPARATUS FOR AUTOMATIC ESTIMATION OF TRAFFIC REASSIGNMENT

The present disclosure relates generally to communication networks and, more particularly, to a method and apparatus for automatic estimation of traffic reassignment for a network, e.g., a wireless network.

BACKGROUND

As Internet usage continues to grow, more and more customers are accessing communications services via a mobile device, e.g., a cell phone, a smart phone, a laptop computer, etc. For example, a customer may receive multimedia content via his/her cell phone. The cell phone transmits and receives voice and data packets to and from the service provider's network via a base station and an access network.

The customer's ability to access services via a wireless device is dependent on the availability of capacity on various network elements, e.g., radio access networks, cell site equipment and so on. The service provider may forecast the demand for a radio access network and/or cell site equipment such as a base station and deploy the network accordingly. As usage and the number of customers grow, the service provider may use the forecast to periodically expand the network. The expansion of the network may trigger offloading a portion of network traffic that is currently being carried by the existing network to a newly added portion. Conversely, if the forecast indicates a decline of network traffic volume, a portion of the existing network may be retired. The decommissioning or retirement of a portion of the existing network may trigger a need to offload the traffic that is currently being carried by the portion of the network that is being retired to other portions of the network. Hence, the service provider needs to perform traffic reassignment to handle either a declining or an increasing network traffic volume.

One approach for performing the traffic reassignment is for a user (e.g., a network planner) to manually select the traffic to be offloaded. However, this approach is highly labor intensive and error prone. Furthermore, the selection is highly subjective. As such, the usefulness of the expansion of the network or the decommissioning of a portion of the network is highly dependent on the planning experience and instinct of the user.

SUMMARY OF THE DISCLOSURE

In one embodiment, the present disclosure teaches a method and apparatus for providing an estimation of traffic reassignment for a network, e.g., a wireless network. For example, the method obtains data from a database, wherein the data comprises at least one offload sector and at least one relief sector, wherein the data comprises physical characteristics of an antenna for each of the at least one offload sector and at least one relief sector, and for each relief sector of the at least one relief sector, determines if a first distance between a center of a traffic circle of the relief sector and a center of a traffic circle of an offload sector of the at least one offload sector is less than or equal to a first sum of a radius of the traffic circle of the relief sector and a radius of the traffic circle of the offload sector. The method for each relief sector of the at least one relief sector, adds a tuple to an offload candidate set of the relief sector, if the first distance is less than or equal to the first sum, and for each relief sector of the at least one relief sector, computes an offload percentage for the tuple added to the offload candidate set of the relief sector. The method for each relief sector of the at least one relief sector, adds the tuple into a potential relief host set of the offload sector, wherein the tuple added to the potential relief host set includes the computed offload percentage and for each offload sector of the at least one offload sector, selects a relief sector of the at least one relief sector based on a maximum offload percentage, wherein the selecting is based on examining the potential relief host set of the offload sector.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for automatic estimation of traffic reassignment for a network, e.g., a wireless network, or a cellular network. Although the teachings of the present disclosure are discussed below in the context of a wireless network, the teaching is not so limited. Namely, the teachings of the present disclosure can be applied for other types of networks, wherein estimation of traffic reassignment from a network portion to another network portion is beneficial for timely network planning, e.g., deployment and/or decommissioning of various network resources.

Figure 1:
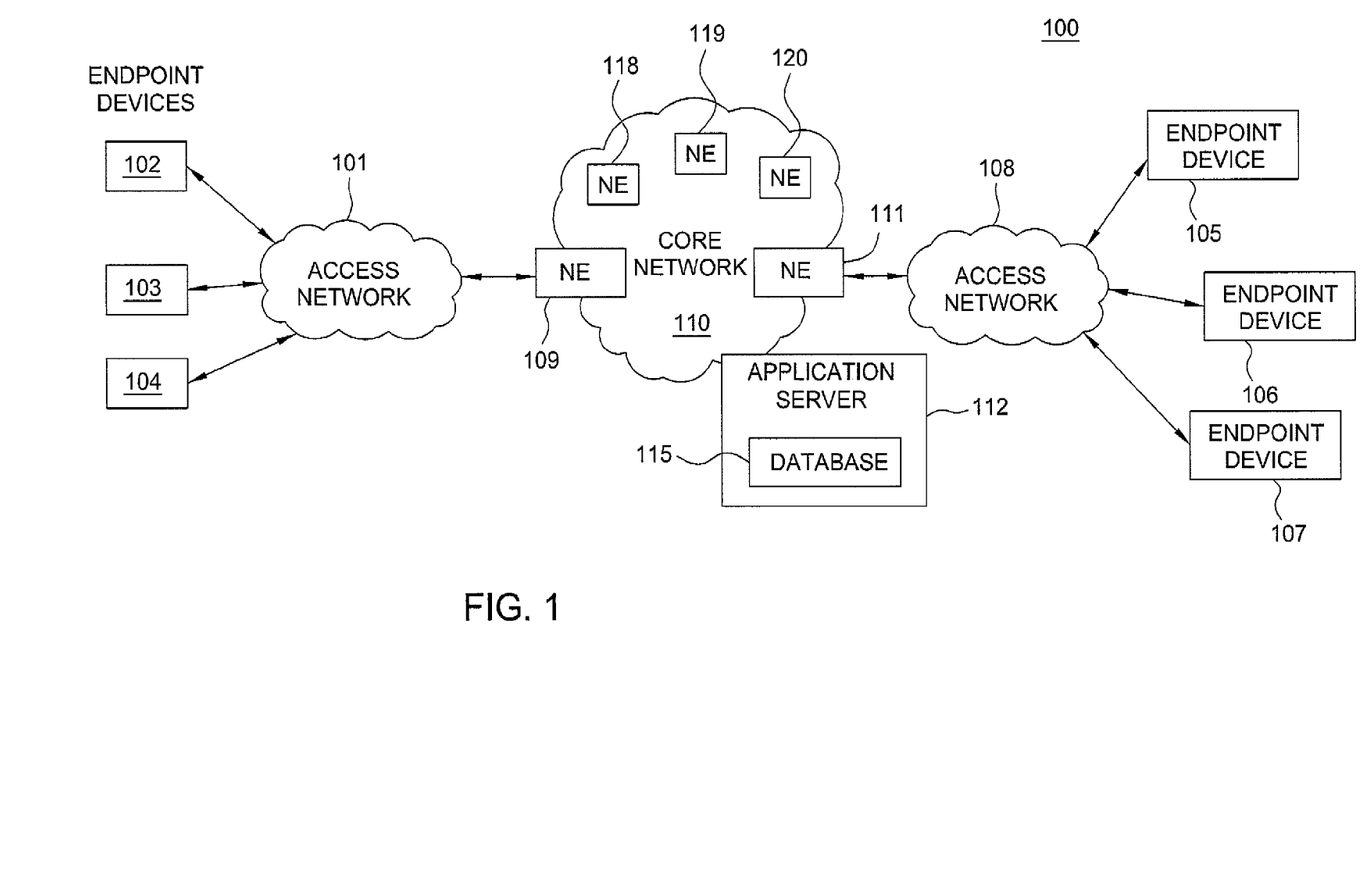
FIG. 1 is a block diagram depicting an illustrative network related to the current disclosure.

FIG. 1 is a block diagram depicting an illustrative network 100 related to the current disclosure. Illustrative networks may include Internet protocol (IP) networks, Ethernet networks, wireless networks, cellular networks, and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, cellular phones, smart phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a cellular network, a 3$^{rd}$ party network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g., voice and data services, are transmitted on networks.

In one embodiment, a service provider may enable customers to access services via a wireless access network, e.g., a cellular network. For example, a customer may use a cell phone to access Internet Protocol (IP) services, multimedia services, and the like. The packets from and to the wireless device, e.g., a cell phone, may then traverse one or more radio access networks and equipment, e.g., base stations.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The base station may also be referred to as a three sector base station.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized.

The service provider may size the capacity of the radio access network and equipment, e.g., base stations and/or antennas, to be implemented in the radio access network based on a forecast of the network traffic. For example, the service provider may determine that the forecast indicates an increase or a decrease of the network traffic volume. The change in the network traffic volume may then trigger deployment of one or more new sectors or decommissioning of one or more existing sectors. The service provider may then need to perform traffic reassignment due to the deployment of new sectors and/or the decommissioning of existing sectors. One approach for performing the traffic reassignment is having a network planner manually performing a selection of the traffic to be offloaded (reassigned). However, as discussed above this approach is highly labor intensive and error prone. Furthermore, the manual selection by the network planner is subjective and not based on the underlying network parameters.

In one embodiment, the current disclosure describes a method for providing an automatic estimation of traffic reassignment for a network, e.g., a wireless network.

Figure 2:
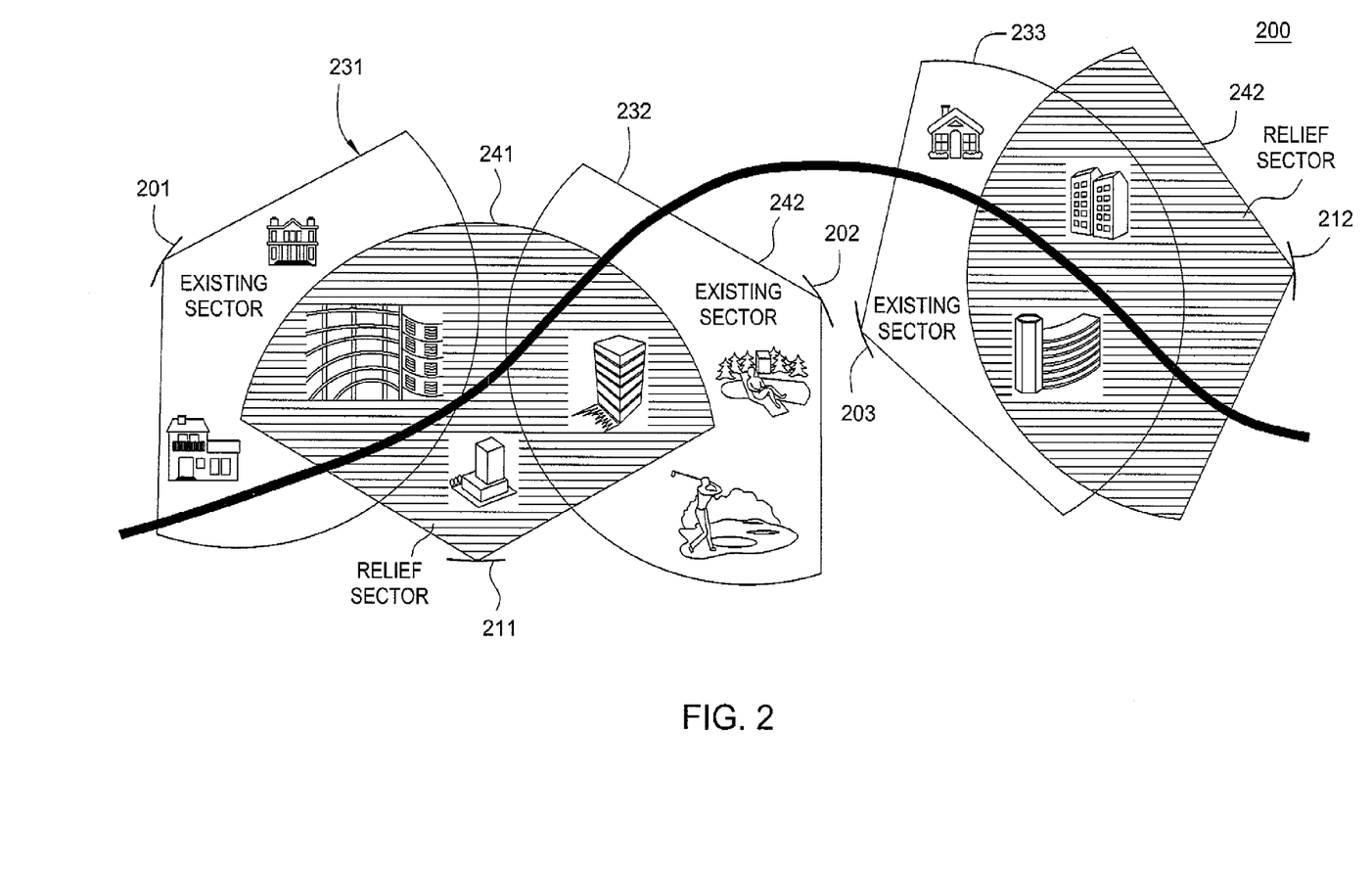
FIG. 2 illustrates an environment with various sectors.

FIG. 2 illustrates an environment 200 with various sectors. For example, the environment 200 illustratively comprises existing sectors 201-203 and relief sectors 211-212. In one embodiment, the existing sectors 201-203 are sectors that are facing traffic overload necessitating the introduction of relief sectors. The relief sectors 211 and 212 are sectors being deployed such that the traffic that would have been carried by the existing sectors can instead be carried on the relief sectors. Since the existing sectors are the sectors from which the traffic is being offloaded, the existing sectors are also referred to as offload sectors. Each sector has a specific geographical range. For example, the geographical ranges 231-233 illustrate the geographical reaches of the existing sectors 201-203, respectively. The geographical ranges 241-242 illustrate the geographical reaches of the relief sectors 211-212. As shown in FIG. 2, the relief sector 211 has a geographical range that overlaps with the geographical ranges of the existing sectors 201 and 202. Hence, some traffic from sectors 201 and 202 may be offloaded to sector 211. Similarly, the relief sector 212 has a geographical range that overlaps with that of the existing sector 203. Thus, the relief sector 212 can be used to relieve some of the traffic of the existing sector 203 but not for the existing sectors 201 and 202. The relief sector 211 can be used to relieve the existing sectors 201 and 202 but not sector 203.

One approach to offload traffic from existing sectors to relief sectors is to specify the set of existing sectors from which traffic is being offloaded and a corresponding set of relief sectors to which the traffic is being reassigned. The process of reassigning traffic may be described as follows:

First, the method defines a window of time wherein a traffic forecast is available for the window of time. For example, traffic forecast may be available for time periods 0, ... W, e.g., months 0, ... W. The relief sector may be deployed at a specific time in a time period within a forecast window. Then, the problem may be mathematically defined as follows:

Let r denote a forecast month of deployment, wherein the forecast window comprises months 0, ... W;

Let m represent the number of existing sectors that are affected by the current offloading to a particular relief sector chosen for illustration;

Let, $OTF_{iw}^{OLD}$ denote the traffic forecast at an affected offload (existing) sector i during a forecast month w if the relief sector is not to be deployed;

Let, $OTF_{iw}^{NEW}$ denote the modified traffic forecast at an offload (existing) sector i during a forecast month w if the relief sector is deployed, wherein $W \geq w \geq r$;

Let, $RTF_w$ denote the traffic forecast at the relief sector during a forecast month w, wherein $w \geq r$;

Let, $OF_i$ denote the offload fraction (also referred to as offload percentage) for the relief sector and the offload (existing) sector i; and Let, S denote any stimulus component of traffic specified by a user, wherein S is outside the purview of the method of the current disclosure.

Then, the modified traffic forecast at an offload (existing) sector i and the traffic forecast at the relief sector during a forecast month w are derived from the offload fraction using equations (1) and (2) as follows:

$$OTF_{iw}^{NEW} = OTF_{iw}^{OLD} \times (1-OF_i), i=1,\ldots,m; w=r,\ldots,W;$$

$$RTF_w = \Sigma_{i=1}^m (OTF_{iw}^{OLD} \times OF_i) + S, w=r,\ldots,W; \quad (2)$$

Once the reassignment of traffic for month r is completed, the new sector that was added in month r becomes an existing sector subject to reassignment for later months, beginning with the month r+1.

In one embodiment, the current disclosure provides a method for automatically estimating the offload percentages for each pair of relief and existing (offload) sectors. Hence, the current disclosure provides a method for determining the $OF_i$ used in the above equations.

In order to more clearly illustrate the present disclosure, the following terminologies will first be described:
  Traffic circle; and
  Traffic Circle Intersection Fraction (TCIF).

In one embodiment, a traffic circle refers to a circular approximation of the geographical range of a sector. The traffic circle may be visualized as being a circle on the ground below the antenna in a base station, covering the geographical range for the antenna sector. For an existing antenna in a base station, the traffic circle approximates the geographical area that originates its current traffic. For a relief sector antenna that is being added, the traffic circle approximates the geographical area from where the antenna can pick up offload traffic.

In one embodiment, Traffic Circle Intersection Fraction (TCIF) refers to a ratio of a first area and a second area, wherein the first area comprises the area of the intersection of the relief and offload (existing) traffic circles, and the second area comprises the area of the offload (existing) traffic circle. Hence, in order to determine the TCIF, the current method first determines the traffic circles of the relief and existing sectors.

Figure 3:
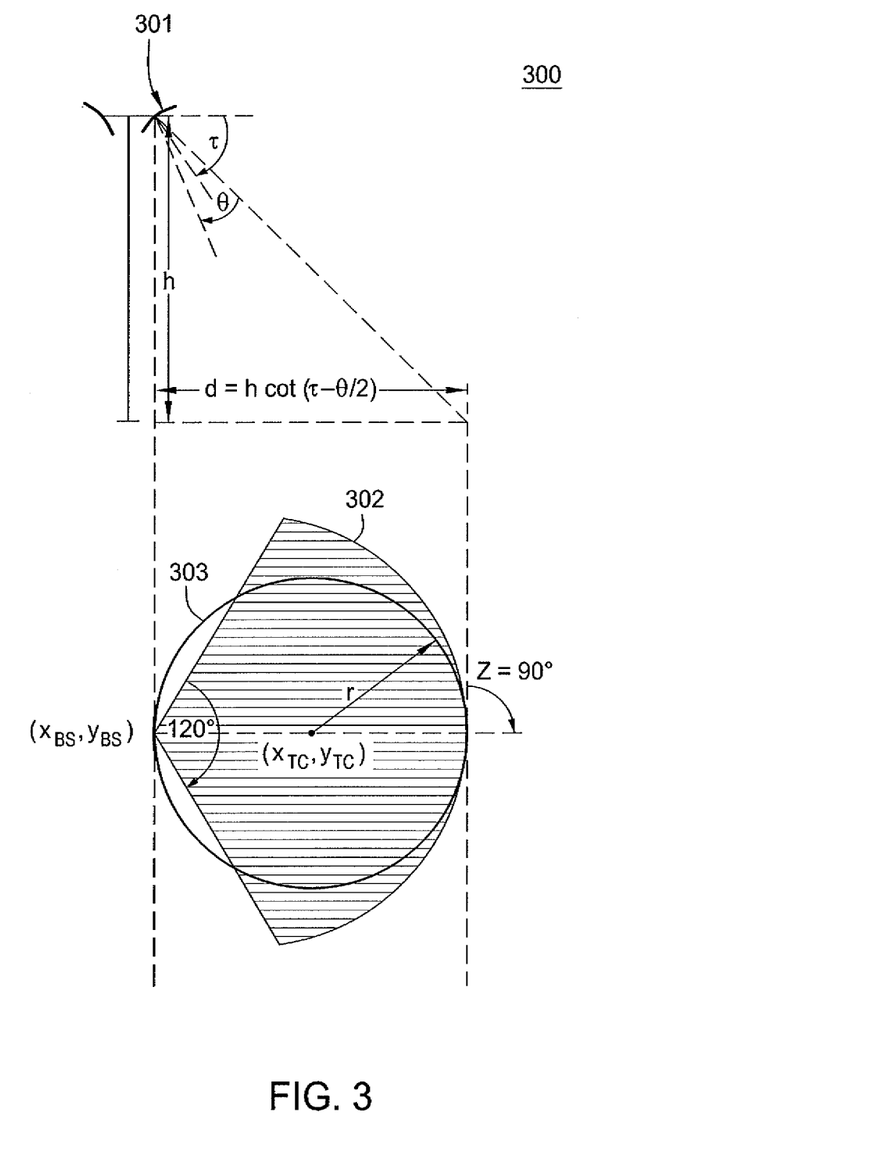
FIG. 3 provides an illustration of an exemplary traffic circle of the current disclosure for an antenna.

FIG. 3 provides an illustration of an exemplary traffic circle 300 of the current disclosure for an antenna. The antenna 301 has a geographical range 302 which may be approximated by the traffic circle 303. The physical characteristics of the antenna 301 are denoted as follows:

τ: Tilt angle of the antenna;
  θ: Vertical beam width of the antenna;
  h: Height of the antenna;
  d: Geographical range of the sector in the base station;
  Z: Azimuth of the antenna (90 degree in this example);
  $(X_{BS}, Y_{BS})$: Cartesian coordinate location of the antenna in the base station; and
  $(X_{TC}, Y_{TC})$: Cartesian coordinate location of the center of the traffic circle.

The radius of the traffic circle r is then:

$$r = \frac{d}{2}, \text{ wherein } d = h\text{Cot}(\tau - \theta/2) \quad (3)$$

For example, for an antenna with h=60 meters, τ=7.6°, θ=1°, then, d=482 meters and r=241 meters.

The Cartesian coordinate location of the center of the traffic circle is determined using the following equations:

$$X_{TC} = X_{BS} + (d \sin Z)/2 \quad (4)$$

$$Y_{TC} = X_{BS} + (d \cos Z)/2 \quad (5)$$

In order to distinguish the centers of the relief and offload (existing) sectors, the following terminologies are used for the centers of the relief and offload sectors, respectively.

$(X_{TC}^R, Y_{TC}^R, r_R)$ denote the circle coordinates for the relief sector; and $(X_{TC}^O, Y_{TC}^O, r^O)$ denote the circle coordinates for the offload sector. \quad (6)

Once the traffic circles for the relief and offload sectors are determined, the method then determines the TCIF. For example, the method determines the ratio of the area of intersection of the relief and offload traffic circles to the area of the offload traffic circle.

In one embodiment, the current method determines the offload fraction ($OF_i$) from the TCIF. The offload fraction may also be referred to as offload percentage. For example, in one embodiment, after a relief antenna is deployed, traffic may attach to an offload antenna or a relief antenna with equal likelihood. Then, the OF may be determined as follows:

$$OF = \frac{TCIF}{2} \quad (7)$$

In the above equation, determining of the OF is based on traffic attaching to an offload antenna or a relief antenna with equal likelihood. However, if the relief and offload antennas use different carrier frequencies, the allocation of traffic to the relief and offload antennas may not be with equal likelihood. The service provider determines the appropriate likelihood of attachment to a specific antenna. For example, the OF may be 0.6*TCIF. In one embodiment, the current method uses 850 Mhz and 1900 Mhz carrier frequencies with the values of OF shown in Table 1.

TABLE 1

Exemplary OF for offload and relief sectors

| Carrier Frequency for Relief sector | Carrier Frequency for Offload Sector | OF |
| --- | --- | --- |
| 850 Mhz | 850 Mhz | 0.5 × TCIF |
| 1900 Mhz | 1900 Mhz | 0.5 × TCIF |
| 850 Mhz | 1900 Mhz | 0.6 × TCIF |
| 1900 Mhz | 850 Mhz | 0.4 × TCIF |

In the above determination of the range of the antenna, the tilt angle of the antenna was used in equation (3). However, in some practical scenarios the tilt angle may either be unavailable or set to zero. In one embodiment, the current method provides another approach to estimating the range d from the transmitted power of the base station as follows:

Let, X: Transmitted power of the base station in dB;
  Y: An estimate of the received signal strength in dB determined using a Hata-Okamura wireless signal propagation model of equation (8), provided below;
  f: Carrier frequency of base station antenna in Mhz;
  h: Height of the antenna in meters; and
  d: range of the antenna in meters.

In one embodiment, the default values for the parameters (expressed in dB) in the Hata-Okamura wireless signal propagation model are:

$A=69.55$ (for $f=900$ Mhz) and $A=46.30$ (for $f=1800$ Mhz);

$B=26.16$ (for $f=900$ Mhz) and $B=33.90$ (for $f=1800$ Mhz);

$C=-13.82; D=44.90;$ and $E=-6.55.$

Then, $$Y = X - A - B\log(f) - C\log(h) - (D + E\log(h)) \cdot \log(d/1000). \quad (8)$$

Therefore, if $Y_{min}$ is a minimum limit on the received signal strength (e.g. $-120$ dB), then the range of antenna (d) is given (in meters) by:

$$d = 1000 \times 10^{\wedge}\left\{\frac{X - A - B\log(f) - C\log(h) - Y}{D + E\log(h)}\right\}. \quad (9)$$

In one embodiment, the current method combines the above two ways of estimating d as follows:

$$d = \text{Min}\left[h\text{Cot}\left(\tau - \frac{\theta}{2}\right), 1000 \times 10^{\wedge}\left\{\frac{X - A - B\log(f) - C\log(h) - Y}{D + E\log(h)}\right\}\right] \quad (10)$$

The method then uses equations (3) to (5) to determine the $(X_{TC}^R, Y_{TC}^R, r^R)$ and $(X_{TC}^O, Y_{TC}^O, r^O)$. Then, TCIF may be found as follows:

First let $(X_A, Y_A, r_A)$ designate the smaller of the traffic circles $(X_{TC}^R, T_{TC}^R, r^R)$ and $(X_{TC}^O, Y_{TC}^O, r^O)$ and let First let $(X_B, Y_B, r_B)$ designate the larger of the traffic circles $(X_{TC}^R, Y_{TC}^R, r^R)$ and $(X_{TC}^O, Y_{TC}^O, r^O)$. That is, $r_A \leq r_B$. Then, the distance w between their centers is:

$$w = \sqrt{(x_A - x_B)^2 - (y_A - y_B)^2}. \quad (11)$$

Then, TCIF is given by:

$$TCIF = \begin{cases} \frac{r_A^2}{(r^o)^2} & 0 \leq w \leq r_B - r_A \\ \frac{r_A^2}{(r^o)^2}[1-Q] & r_B - r_A < w \leq \sqrt{r_B^2 - r_A^2} \\ \frac{r_A^2}{(r^o)^2}[Q] & \sqrt{r_B^2 - r_A^2} < w \leq r_B + r_A \\ 0 & r_B + r_A \leq w \leq \infty \end{cases} \quad (12)$$

wherein, $$Q = \frac{1}{2\pi}\arccos\left(1 - \frac{s^2}{2r_A^2}\right) + \frac{r_B^2}{2\pi r_A^2}\arccos\left(1 - \frac{s^2}{2r_B^2}\right) - \frac{ws}{2\pi r_A^2}$$

$$s = \sqrt{2(r_B^2 + r_A^2) - w^2 - \left(\frac{r_B^2 - r_A^2}{w}\right)^2}$$

The method, as described above, may be used to determine an OF for a pair of offload and relief sectors. However, an offload (existing) sector may have traffic that may be off-loaded to a plurality of relief sectors. Hence, running the algorithm above may result in the same traffic that needs to be reassigned being picked up by more than one relief sector that are being added. Hence, the current disclosure also provides an algorithm that comprises a method for resolving conflicts, as described below.

In one embodiment, the method first obtains data from a forecast database. In one embodiment, the forecast database may include, coordinates, azimuths, transmitted power levels of antennas, antenna heights, tilt angles, etc. of existing and relief sectors applicable to the next forecast cycle.

The method then defines a relief set and an offload set. The relief set comprises the set of all relief sectors, and the offload set comprises the set of all offload sectors each of which has been selected by one or more relief sectors in the relief set.

Each potential relief sector has an associated set of tuples referred to as Offload Candidate Set (OCS). Each potential offload sector also has an associated set of tuples referred to as Potential Relief Host (PRH) set. Each tuple is made up of the identity of a sector and an associated OF value computed from Table (1).

In one embodiment, the method temporarily populates the OCS for each relief sector with tuples corresponding to all offload sectors in the offload set, each of which satisfies the following rule (tentatively leaving the OF field in the added tuples blank):

If the distance between the centers of the relief traffic circle and the offload traffic circle in question is less than or equal to the sum of their radii, then the offload sector becomes an element of the OCS of the relief sector. Otherwise (implying that the OF corresponding to the relief and offload sector pair under consideration is certainly zero), the offload sector is not included as a member of the OCS of the relief sector.

In one embodiment, the method then performs initial assignment for each relief sector as follows: The method computes the OF for each member (element) of the OCS of the relief sector, based on the traffic circles associated with this relief sector and member offload sector in question. A tuple, populated with the identity of the relief sector and the OF value thus computed is added to the PRH associated with the member offload sector in question.

In one embodiment, the method then clears the OCSs of all the relief sectors, and examines the PRH of each offload sector for uniqueness of its membership. For each offload sector with a non-unique PRH, a tie-breaker step is performed to select its unique relief sector (unique host) based on the maximum of OF values among the member tuples in the PRH, and all but the winning tuple are deleted from the PRH.

Following the above step in the preceding paragraph, it is assured that every offload sector has a PRH with unique membership. In one embodiment, for each offload sector, the method adds a tuple that contains the identity of this offload sector and the (maximum) OF value indicated by the unique member in its PRH, to the OCS associated with the selected (host) relief sector as indicated by the unique PRH member.

At the end of the above step in the preceding paragraph, the relief set contains all the relief sectors and tuples in the respective OCSs identify the corresponding sets of (single or multiple) offload sectors along with the respective OF values. For each relief sector, the method then executes the offloads for each offload sector in its OCS, based on the respective OF identified in the tuple.

Figure 4:
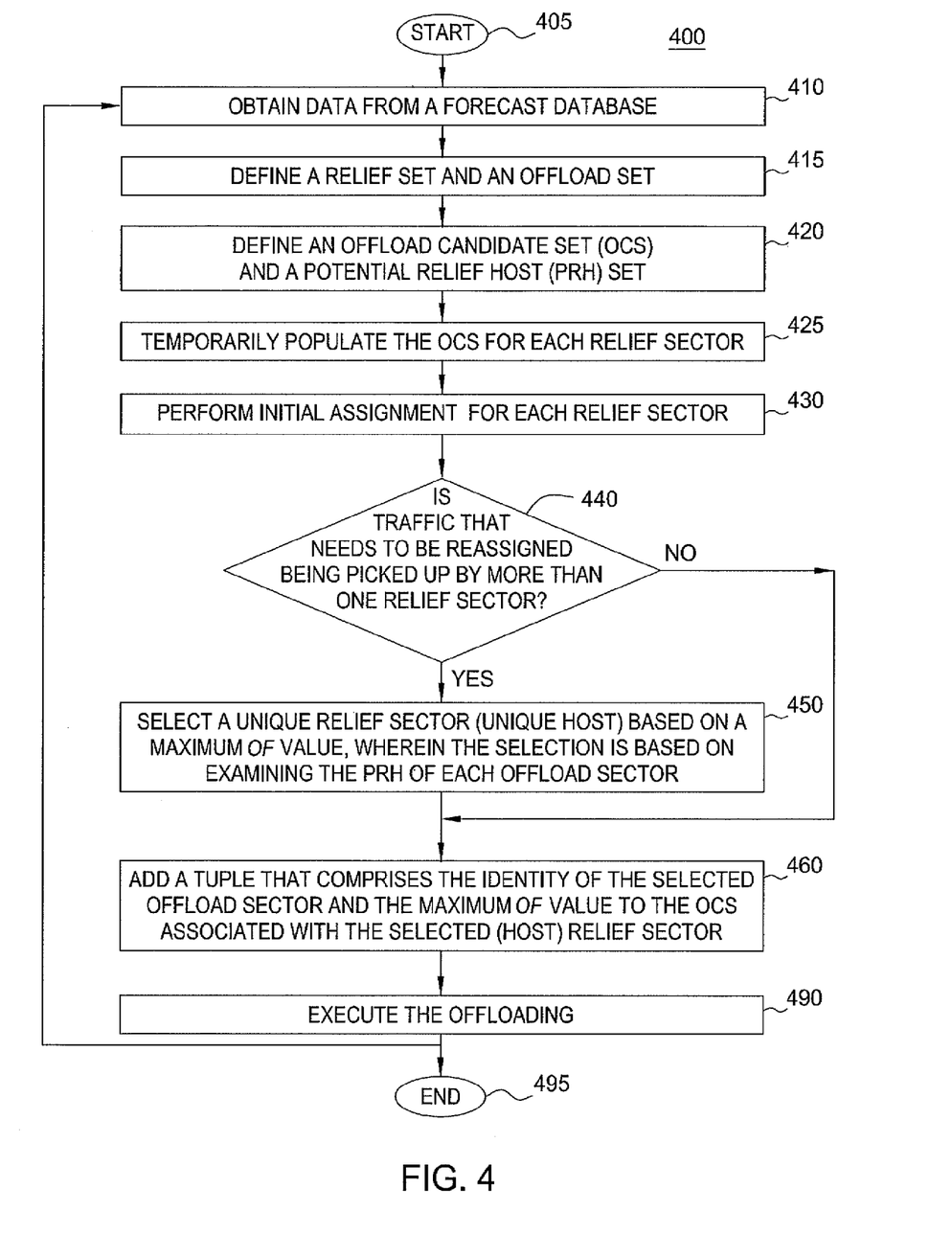
FIG. 4 illustrates a flowchart of the method for traffic reassignment for a network.

FIG. 4 illustrates a flowchart of the method 400 for traffic reassignment for a network. One or more steps of method 400 can be implemented on an application server. Method 400 starts in step 405 and proceeds to step 410.

In step 410, method 400 obtains data from a forecast database. In one embodiment, the forecast database may include, traffic data, coordinates, azimuths, transmitted power levels of antennas, antenna heights, tilt angles, etc. of existing and relief sectors applicable to the next forecast cycle.

In step 415, method 400 defines a relief set and an offload set. The relief set comprises the set of all relief sectors, and the offload set comprises the set of all offload sectors each of which has been selected by one or more relief sectors in the relief set.

In step 420, method 400 defines an OCS set and a PRH set. The OCS set contains a set of tuples of offload sectors and their respective computed offload percentages (OF values). The PRH set contains a set of tuples of relief sectors and their computed OF values.

In step 425, method 400 temporarily populates the OCS for each relief sector, as follows: If the distance between the centers of the relief traffic circle and the offload traffic circle is less than or equal to the sum of their radii, the offload sector becomes an element of the OCS. Otherwise, the offload sector is not a member of the OCS of this relief sector, since the TCIF and hence the OF for the offload/relief sector pair in question is certainly zero.

In step 430, for each relief sector, the method 400 performs an initial assignment for each relief sector. For example, the method computes the OF for each member (element) of its OCS. That is, the method computes the OF for each tuple, which was previously populated in step 425 without the respective OF. The method then adds a tuple, containing the identity of this relief sector and the OF value computed, to the PRH of the offload sector indicated by the OCS tuple in question. The OCS entries of all relief sectors are cleared at the end of step 430 following the above actions, since they are no longer needed (and will be repopulated afresh in step 460 as discussed below). Step 430, essentially performs initial assignment for each relief sector. However, the initial assignment may result in multiple entries in the PRH's of individual offload sectors. While this could be a natural reflection of traffic from an offload sector being picked up by more than one relief sector, identification of the predominant host as the unique relief sector is desirable for ease of network planning calculations. Thus, an examination of the resulting assignment in the set of PRH's is needed to identify non-unique PRH memberships and apply tie-breaker logic. As such, the method therefore proceeds to step 440.

In step 440, applied in parallel to each offload sector in the offload set, method 400 determines if the PRH contains more than one member tuple (indicating multiple candidate relief sectors). If the PRH entry is unique, the method proceeds to step 460. Otherwise, the method proceeds to step 450.

In step 450, applied in parallel to each offload sector in the offload set with non-unique PRH, method 400 selects/enforces a unique relief sector (unique host) based on a maximum OF value, among those recorded in the multiple tuples contained in the PRH of the offload sector in question.

In step 460, which applies in parallel to each and every offload sector, method 400 adds a tuple that contains the identity of this offload sector and the OF value indicated by the unique tuple (either naturally unique or made unique via tie breaker) in its PRH, to the OCS of the relief sector indicated in the unique PRH tuple. When examination of all the PRHs of the offload sectors is completed (i.e., the parallel invocations of steps 440, 450 and 460 are completed), the relief set contains all the relief sectors and respective OCSs provide the corresponding sets of offload sectors and the value of the OF.

In step, 490, method 400 executes the offloading. For example, for each relief sector, the method executes the offloads for each offload sector in its OCS, based on the respective OF identified in the tuple. Broadly, in one embodiment, executing the offloads merely comprises turning on the pertinent relief sector(s). It should be noted that in one embodiment, executing the offload may encompass providing the relief set containing all of the relief sectors and respective OCSs as an output, e.g., a report, in support of a capacity planning function or a forecasting function. The method then proceeds to step 495 to end processing the current reassignment or returns to step 410 to obtain more data.

Figure 5:
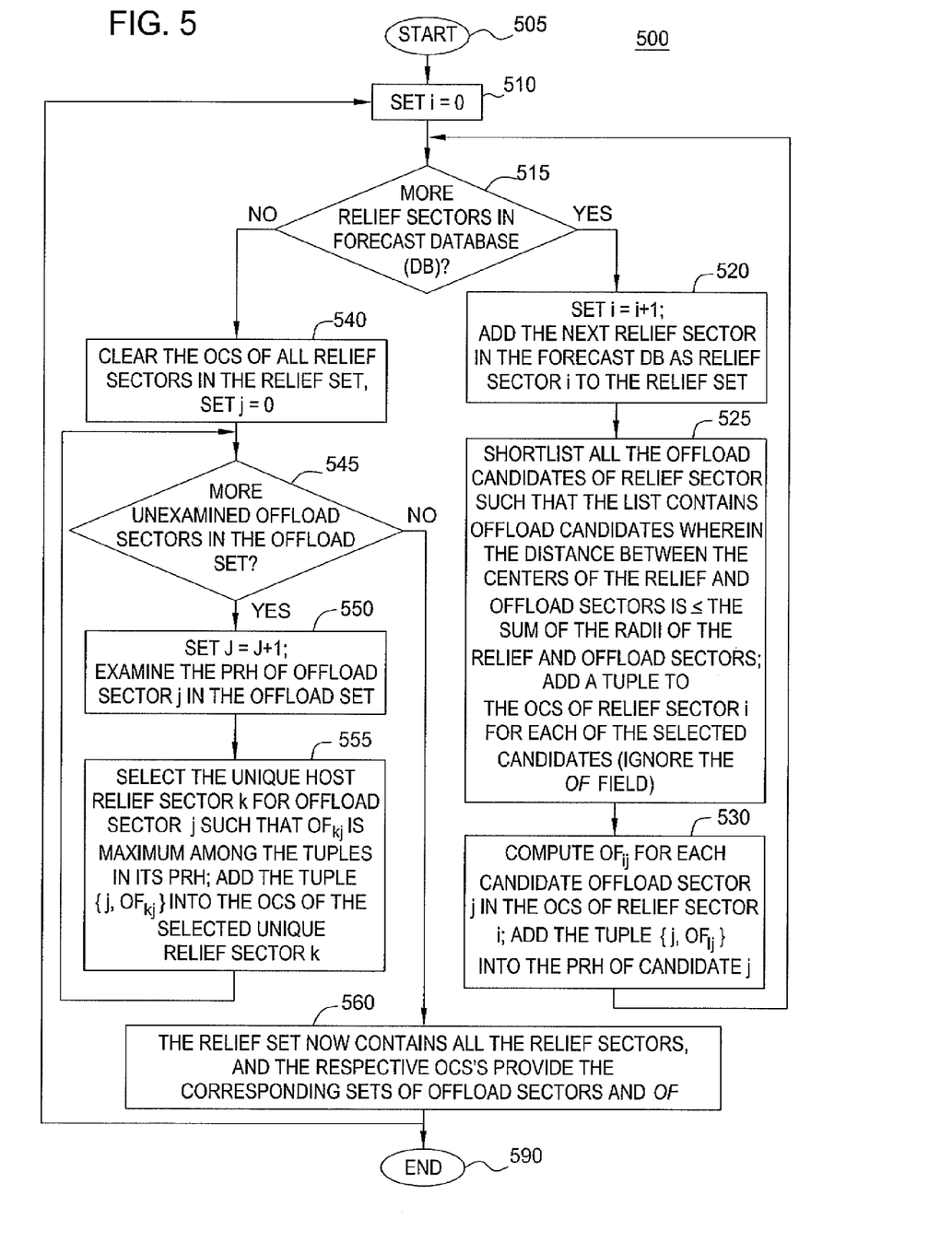
FIG. 5 illustrates a flowchart of a method for performing traffic reassignment for a network while resolving conflicts.

FIG. 5 illustrates a flowchart of a method 500 for performing traffic reassignment for a network while resolving conflicts, if conflicts exist. More specifically, FIG. 5 provides more details relating to steps 430-460 of FIG. 4 in one illustrative embodiment. One or more steps of method 500 can be implemented on an application server. Method 500 starts in step 505 and proceeds to step 510.

In step 510, method 500 sets a relief sector counter t to zero. The method then proceeds to step 515.

In step 515, method 500 determines if there are relief sectors (or more relief sectors) in the forecast database. If there are more relief sectors, the method proceeds to step 520. Otherwise, the method proceeds to step 540.

In step 520, method 500 increments the relief sector counter and adds the next relief sector in the forecast database as the relief sector i to the set containing the relief sectors. The method then proceeds to step 525.

In step 525, method 500 then shortlists the offload candidates of relief sector i from among the existing sectors in the forecast database. For example, the method may populate the OCS for each relief sector, based on a rule as follows. If the distance between the centers of the relief traffic circle and the offload traffic circle is less than or equal to the sum of their radii, the offload sector becomes an element of the OCS. Otherwise, the offload sector is not a member of the OCS, since the TCIF and the OF for the offload/relief sector pair would certainly be zero. The method then proceeds to step 530.

In step 530, method 500 computes the OF for each member (element) of the OCS and adds a tuple into the PRH of the candidate offload sector. For example, for each candidate offload sector j in the OCS of the relief sector i, the method computes $OF_{ij}$. A tuple $[i, OF_{ij}]$ is then added into the PRH of the candidate relief sector. The method then returns to step 515 to determine if there are more relief sectors.

In step 540, method 500 clears the OCS of all relief sectors that are elements of the relief set (the set containing the relief sectors) and resets the counter for the candidate offload sectors. For example, the method sets j=0. The method then proceeds to step 545.

In step 545, method 500 determines if there are offload sectors in the offload set whose PRH has not been examined. If there is at least one offload sector whose PRH has not been examined, the method proceeds to step 550. Otherwise, the method proceeds to step 560.

In step 550, method 500 increments the counter for the offload sector and examines the PRH of offload sector 1. For example, the method sets j=j+1 and examines the PRH of the offload sector j. The method then proceeds to step 555.

In step 555, method 500 selects a unique relief sector for offload sector j such that the offload percentage is the maximum among the tuples in the PRH of the offload sector. Note that this action is necessary only if the PRH of offload sector j contains more than one entry. Method 500 then adds a new tuple that contains the identity of the offload sector (j) and the OF value indicated by the unique PRH tuple, to the OCS associated with the selected (host) relief sector (again, as indicated in the unique PRH tuple). For example, a unique relief sector k for an offload sector j is selected such that $OF_{kj}$ is maximum among the tuples in the PRH of the offload sector (if the PRH for the offload sector j originally contained multiple entries) and the new tuple $\{j, OF_{kj}\}$ is then added into the OCS of the selected relief sector k. The method then proceeds to step 545 to determine if there are more offload sectors in the offload set whose PRH has not been examined.

In step 560, method 500 generates the relief set that now contains all the relief sectors, and the respective OCS's provide the corresponding sets of offload sectors and the value of the OF. The method then executes the offloads from each offload sector in the relief sector's OCS, based on the respective OF identified in the tuple. Again, in one embodiment, executing the offloads merely comprises turning on the pertinent relief sector(s). Similarly, it should be noted that in one embodiment, executing the offload may encompass providing the relief set containing all of the relief sectors and respective OCSs as an output, e.g., a report, in support of a capacity planning function or a forecasting function. The method then either proceeds to step 590 to end processing the current set of relief sectors, or returns to step 510 to process another set of relief sectors.

In the description above, one of the reasons for reassignment can be sector de-commissioning. De-commissioning may be more clearly understood by analyzing the impact of the de-commissioning on traffic.

Referring to FIG. 2, if the relief sector 241 was to be relabeled as an existing sector to be de-commissioned, then its traffic would need to be reverse offloaded to the existing (neighbor) sectors 201 and 202. The current method provides a reverse offload fraction ROF determined as follows:

If there are in viable candidate neighbor sectors to which traffic may be offloaded, the ROF for each viable candidate neighbor may be robustly approximated as:

$$ROF_i = \frac{OF_i}{\sum_{j=1}^{m} OF_j}, i = 1, \ldots, m. \quad (13)$$

Then, for a month of decommissioning r, $DTF_w$ and $NTF_{iw}$ respectively denoting traffic forecasts for the sector to be de-commissioned, and neighbor sector t, for the forecast month w, with the superscripts OLD and NEW being used in the same sense as before, the traffic forecast is then, $$NTF_{iw}^{NEW} = NTF_{iw}^{OLD} + DTF_w^{OLD} \times ROF_i, i = 1, \ldots, m; w = r, \ldots, W. \quad (14)$$

It should be noted that although not specifically stated, one or more steps of methods 400 and 500 may include a storing, displaying and/or outputting step as required for a particular application. In other words, any data, records, fields, and/or intermediate results discussed in the methods 400 and 500 can be stored, displayed and/or outputted to another device as required for a particular application.

Figure 6:
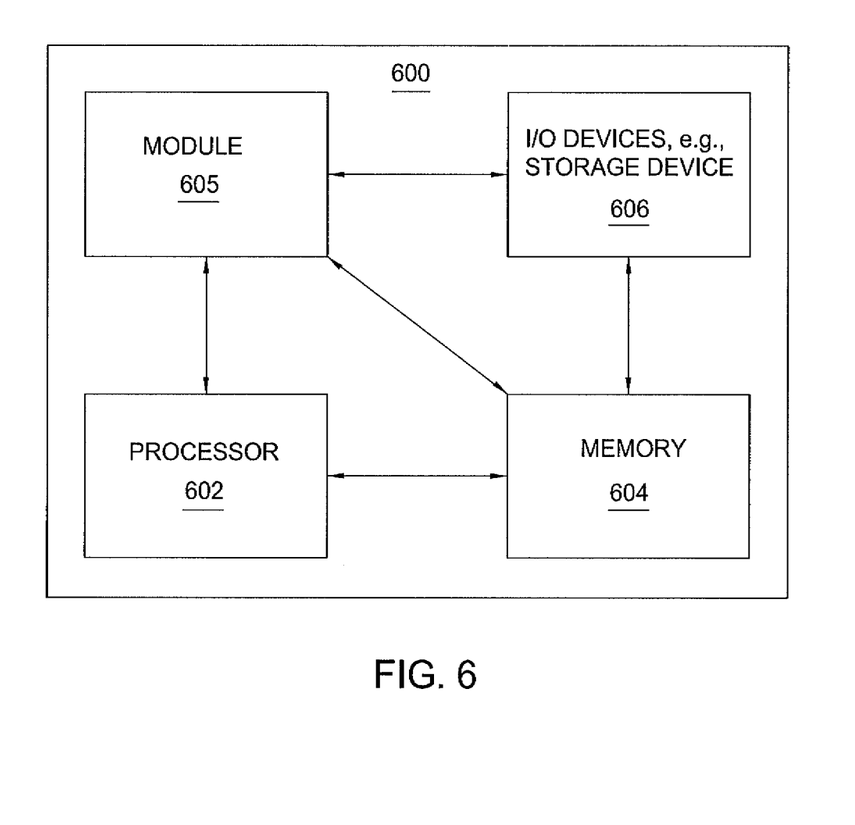
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for automatic estimation of traffic reassignment for a network, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 605 for automatic estimation of traffic reassignment for a network can be loaded into memory 604 and executed by processor 602 to implement the functions as discussed above. As such, the present method 605 for automatic estimation of traffic reassignment for a network (including associated data structures) of the present disclosure can be stored on a non-transitory computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an estimation of traffic reassignment for a network, comprising:

obtaining, by a processor, data from a database, wherein the data comprises at least one offload sector and at least one relief sector, wherein the data comprises physical characteristics of an antenna for each of the at least one offload sector and at least one relief sector;

for each relief sector of the at least one relief sector, determining, by the processor, if a first distance between a center of a traffic circle of the relief sector and a center of a traffic circle of an offload sector of the at least one offload sector is less than or equal to a first sum of a radius of the traffic circle of the relief sector and a radius of the traffic circle of the offload sector;

for each relief sector of the at least one relief sector, adding, by the processor, a tuple to an offload candidate set of the relief sector, if the first distance is less than or equal to the first sum;

for each relief sector of the at least one relief sector, computing, by the processor, an offload percentage for the tuple added to the offload candidate set of the relief sector;

for each relief sector of the at least one relief sector, adding, by the processor, the tuple into a potential relief host set of the offload sector, wherein the tuple added to the potential relief host set includes the computed offload percentage; and for each offload sector of the at least one offload sector, selecting, by the processor, a relief sector of the at least one relief sector based on a maximum offload percentage, wherein the selecting is based on examining the potential relief host set of the offload sector.

2. The method of claim 1, wherein the physical characteristics of the antenna comprises geographical coordinates.

3. The method of claim 1, further comprising:

executing an offloading of traffic based on each relief sector that is selected for a corresponding offload sector.

4. The method of claim 1, wherein the offload percentage is based on a traffic circle intersection fraction.

5. The method of claim 4, wherein the traffic circle intersection fraction is determined in accordance with a range of the antenna, wherein the range of the antenna is based on a transmitted power level of the antenna.

6. The method of claim 4, wherein the traffic circle intersection fraction is determined in accordance with a range of the antenna, wherein the range of the antenna is based on a tilt angle of the antenna.

7. The method of claim 4, wherein the traffic circle intersection fraction is determined in accordance with a range of the antenna, wherein the range of the antenna is based on a transmitted power level of the antenna and a tilt angle of the antenna.

8. The method of claim 1, wherein the traffic reassignment is for a sector being decommissioned.

9. The method of claim 1, wherein the relief sector is a new sector being added to the network.

10. The method of claim 1, wherein the offload percentage is based on a likelihood of attachment to an offload sector verses a likelihood of attachment to a relief sector.

11. The method of claim 10, wherein the likelihood of attachment to an offload sector verses the likelihood of attachment to a relief sector is determined by a service provider.

12. The method of claim 10, wherein the offload percentage is based on traffic attaching to an offload sector or a relief sector with equal likelihood.

13. A non-transitory computer-readable medium storing a plurality of instructions which, when executed by a processor, cause the processor to perform operations for providing an estimation of traffic reassignment for a network, the operations comprising:
obtaining data from a database, wherein the data comprises at least one offload sector and at least one relief sector, wherein the data comprises physical characteristics of an antenna for each of the at least one offload sector and at least one relief sector;
for each relief sector of the at least one relief sector, determining if a first distance between a center of a traffic circle of the relief sector and a center of a traffic circle of an offload sector of the at least one offload sector is less than or equal to a first sum of a radius of the traffic circle of the relief sector and a radius of the traffic circle of the offload sector;
for each relief sector of the at least one relief sector, adding a tuple to an offload candidate set of the relief sector, if the first distance is less than or equal to the first sum;
for each relief sector of the at least one relief sector, computing an offload percentage for the tuple added to the offload candidate set of the relief sector;
for each relief sector of the at least one relief sector, adding the tuple into a potential relief host set of the offload sector, wherein the tuple added to the potential relief host set includes the computed offload percentage; and
for each offload sector of the at least one offload sector, selecting a relief sector of the at least one relief sector based on a maximum offload percentage, wherein the selecting is based on examining the potential relief host set of the offload sector.

14. The non-transitory computer-readable medium of claim 13, wherein the physical characteristics of the antenna comprises geographical coordinates.

15. The non-transitory computer-readable medium of claim 13, further comprising:
executing an offloading of traffic based on each relief sector that is selected for a corresponding offload sector.

16. The non-transitory computer-readable medium of claim 13, wherein the offload percentage is based on a traffic circle intersection fraction.

17. The non-transitory computer-readable medium of claim 16, wherein the traffic circle intersection fraction is determined in accordance with a range of the antenna, wherein the range of the antenna is based on a transmitted power level of the antenna.

18. The non-transitory computer-readable medium of claim 16, wherein the traffic circle intersection fraction is determined in accordance with a range of the antenna, wherein the range of the antenna is based on a tilt angle of the antenna.

19. The non-transitory computer-readable medium of claim 16, wherein the traffic circle intersection fraction is determined in accordance with a range of the antenna, wherein the range of the antenna is based on a transmitted power level of the antenna and a tilt angle of the antenna.

20. An apparatus for providing an estimation of traffic reassignment for a network, comprising:
a processor; and
a non-transitory computer-readable medium storing a plurality of instructions which, when executed by the processor, cause the processor to perform operations, the operations comprising:
obtaining data from a database, wherein the data comprises at least one offload sector and at least one relief sector, wherein the data comprises physical characteristics of an antenna for each of the at least one offload sector and at least one relief sector;
for each relief sector of the at least one relief sector, determining if a first distance between a center of a traffic circle of the relief sector and a center of a traffic circle of an offload sector of the at least one offload sector is less than or equal to a first sum of a radius of the traffic circle of the relief sector and a radius of the traffic circle of the offload sector;
for each relief sector of the at least one relief sector, adding a tuple to an offload candidate set of the relief sector, if the first distance is less than or equal to the first sum;
for each relief sector of the at least one relief sector, computing an offload percentage for the tuple added to the offload candidate set of the relief sector;
for each relief sector of the at least one relief sector, adding the tuple into a potential relief host set of the offload sector, wherein the tuple added to the potential relief host set includes the computed offload percentage; and
for each offload sector of the at least one offload sector, selecting a relief sector of the at least one relief sector based on a maximum offload percentage, wherein the selecting is based on examining the potential relief host set of the offload sector.

* * * * *